United States Patent
McCloskey (10) Patent No.: US 9,373,183 B2
(45) Date of Patent: Jun. 21, 2016

(54) REMOVING AN OCCLUSION FROM AN IMAGE

(71) Applicant: Honeywell International Inc., Morristown, NJ (US)

(72) Inventor: Scott McCloskey, Minneapolis, MN (US)

(73) Assignee: Honeywell International Inc., Morris Plains, NJ (US)

(*) Notice: Subject to any disclaimer, the term of this patent is extended or adjusted under 35 U.S.C. 154(b) by 140 days.

(21) Appl. No.: 14/081,888

(22) Filed: Nov. 15, 2013

(65) Prior Publication Data

US 2014/0133755 A1     May 15, 2014

Related U.S. Application Data

(60) Provisional application No. 61/727,110, filed on Nov. 15, 2012.

(51) Int. Cl.
| | |
|---|---|
| G06K 9/34 | (2006.01) |
| G06T 11/60 | (2006.01) |
| G06T 5/00 | (2006.01) |
| G06T 5/50 | (2006.01) |

(52) U.S. Cl.
CPC . *G06T 11/60* (2013.01); *G06K 9/34* (2013.01); *G06T 5/005* (2013.01); *G06T 5/50* (2013.01); *G06T 2200/21* (2013.01); *G06T 2207/10052* (2013.01)

(58) Field of Classification Search
CPC .......... H04N 13/0495; H04N 13/0443; H04N 13/0029; H04N 13/026; H04N 13/0409; H04N 13/0404; H04N 13/0059; H04N 13/0239; H04N 13/0246; H04N 13/0447; H04N 13/0459; H04N 13/0011; H04N 13/0402; H04N 13/0413; H04N 13/0018; H04N 13/0041; G02B 27/2214; G02B 27/2235; G02B 27/2278
USPC .......................................... 382/173
See application file for complete search history.

(56) References Cited

U.S. PATENT DOCUMENTS

| | | | | |
|---|---|---|---|---|
| 5,527,645 | A * | 6/1996 | Pati ........................... | G03F 1/28 430/22 |
| 2002/0126396 | A1* | 9/2002 | Dolgoff ............. | G02B 27/2278 359/743 |
| 2009/0244309 | A1* | 10/2009 | Maison .............. | G06K 9/00369 348/222.1 |
| 2012/0169842 | A1* | 7/2012 | Chuang ............ | G08B 13/19619 348/39 |
| 2013/0051763 | A1* | 2/2013 | Gong ..................... | H04N 5/268 386/242 |

\* cited by examiner

*Primary Examiner* — Ali Bayat
(74) *Attorney, Agent, or Firm* — Brooks, Cameron & Huebsch, PLLC (57) ABSTRACT

Systems, methods, and devices for reducing an occlusion in an image are described herein. For example, one or more embodiments include a method including providing image information from a first image taken from a light field camera, analyzing image information from multiple sub-aperture images extracted from the image information of the first image to separate foreground and background appearance information, creating a mask of an occlusion based on the separated foreground and background appearance information, and rendering a second, modified image where the mask has been applied to reduce the occlusion in the modified image.

12 Claims, 6 Drawing Sheets

REMOVING AN OCCLUSION FROM AN IMAGE

TECHNICAL FIELD

The present disclosure relates to methods, devices, and systems for removing an occlusion from an image.

BACKGROUND

When capturing a landscape or other distant objects through a nearby object such as a fence, proper composition can be difficult. If the foreground's opening (e.g., the spacing between fence posts) is smaller than the camera's entry pupil, it may not be possible to record the distant scene as intended.

In addition to attenuation of the intended scene, the foreground object may contribute unintended radiance to the image. Also, in addition to reducing an image's aesthetic quality, its utility for forensic purposes may also be reduced.

Surveillance cameras, for instance, may accumulate paint on protective covers that creates a blind spot over part of the scene. Indeed, placement of surveillance cameras is restricted by the need to avoid nearby occlusions.

However, it has been identified that thin occluding objects, or thick occluders near the periphery of the camera's field of view, can be "seen through" with a sufficiently large aperture (e.g., wherein the aperture is larger than the occlusion). When focused on a distant scene, the large aperture induces a blur disc (e.g., the shape of the blur can be resultant of the shape of the aperture) at the occluders depth which is larger than the object, meaning that some rays of light from the background can still reach the entrance aperture of the lens and ultimately contribute to the exposure of the sensor's pixels. However, methods used to clarify the background have been impractical for both consumer photography or surveillance systems without specially trained operators as it is assumed that the foreground object does not contribute significant exposure to the image, and all require either manual user intervention or the provision of multiple images with specific settings.

DETAILED DESCRIPTION

While user input and/or multiple input images are needed to remove partial occlusion from traditional images, the present disclosure demonstrates that the same objectives can be achieved using a single image from a light field type camera. One feature of a light field camera is that it captures intensity as a function of incident angle at the sensor, allowing an image to be rendered that is equivalent to one captured with custom, per-pixel apertures designed to block one or more foreground occluders.

With respect to removing partial occlusion, the ability to render an image using only light coming from un-occluded directions allows the embodiments of the present disclosure to handle occluders with significant reflectance as well as simple attenuators. Embodiments of the present disclosure demonstrate that the light field's rich photographic structure can allow both the removal and the detection of nearby occluding objects, which can result, for example, in an automated, single-image method.

A variety of embodiments are provided in the present disclosure. For example, in one embodiment, a method for reducing an occlusion in an image, includes providing image information from a first image taken from a light field camera, analyzing image information from multiple sub-aperture images extracted from the image information of the first image to separate foreground and background appearance information, creating a mask of an occlusion based on the separated foreground and background appearance information, and rendering a second, modified image where the mask has been applied to reduce the occlusion in the modified image. In some embodiments, the mask can be a binary or continuously valued mask, although other suitable masking techniques may be used in some embodiments.

In another embodiment, a computing device for reducing an occlusion in an image, includes a memory, and a processor coupled to the memory, wherein the processor is configured to execute executable instructions stored in the memory to: provide image information from a first image, analyze image information from multiple sub-aperture images extracted from the image information of the first image to separate foreground and background appearance information, identify an occlusion based on the separated foreground and background appearance information, and render a second, modified image where the appearance of the identified occlusion in the modified image has been reduced.

In a further embodiment, a non-transitory machine-readable medium storing a set of instructions executable by a processor to cause a computer to: provide image information from a first image, analyze image information from multiple sub-aperture images extracted from the image information of the first image to separate foreground and background appearance information, identify an occlusion based on the separated foreground and background appearance information, determine an amplification map wherein the map identifies a level of amplification for one or more regions of the first image, and render a second, modified image where the appearance of the identified occlusion in the modified image has been reduced based upon the amplification map, one or more foreground masks, and information from the sub-aperture images.

In the following detailed description, reference is made to the accompanying figures that form a part hereof. The figures show by way of illustration how one or more embodiments of the disclosure may be practiced.

The embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense. Further, as used herein, "a" or "a number of" something can refer to one or more such things. For example, "occluders" can refer to one or more occluders.

Figure 1:
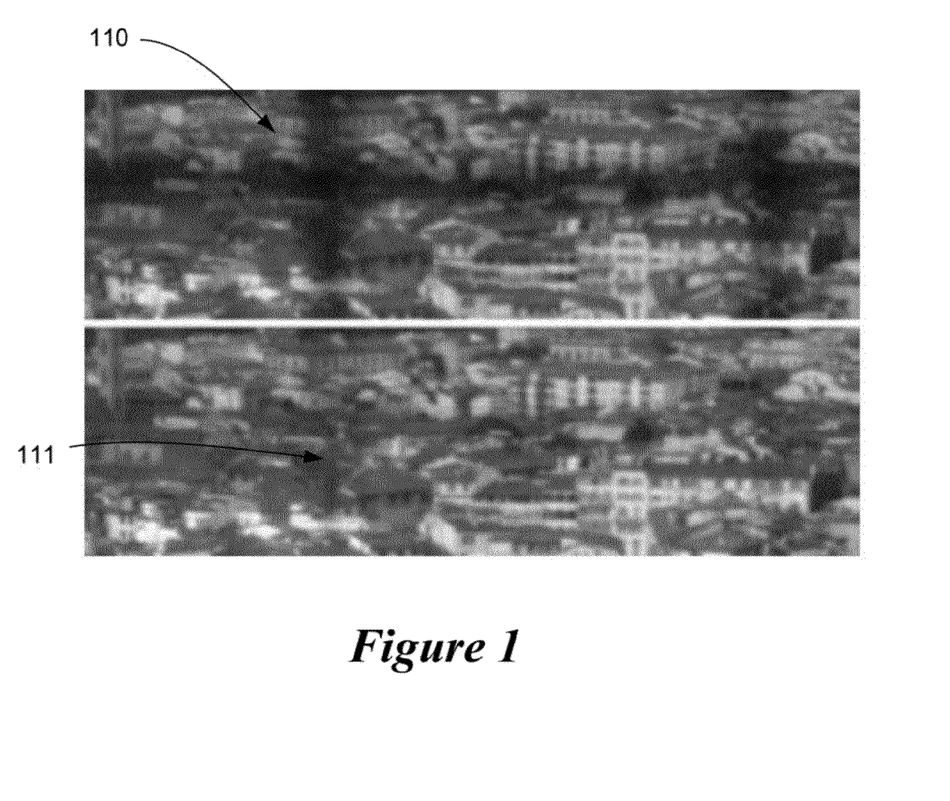
FIG. 1 illustrates a top image wherein a portion of the image is occluded and a bottom output image produced utilizing an embodiment of the present disclosure wherein the occlusion is reduced.

FIG. 1 shows an example where partial occlusion hides interesting details (a blue construction crane) which are clarified by one or more embodiments discussed herein. The top image in FIG. 1 provides an example image region with partial occlusion 110 due to a wire grating. The bottom image provides an output of a method embodiment of the present disclosure on this region, where visibility of the background is improved, revealing the blue construction crane 111 which was previously obscured by the occlusion.

Previous methods for the removal of blurred foreground occluders have typically been intended for conventional cameras. Because conventional cameras do not capture angular information about scene exposure, methods for removing blurred occluders from traditional images require additional information (e.g., multiple images), and often assume that the foreground acts as a simple attenuator. This angular information can, for example, be utilized to separate foreground and background appearance information from the captured image.

Multiple image methods are impractical for images captured with a hand-held camera, as small camera motions will result in divergent parallax motions of the foreground and background layers. Automatic single image methods are thus, for example, limited to texture in-painting, which concentrates mostly on detection of regular, symmetric lattices.

In the present disclosure, embodiments are provided that utilize an automated single image method, for example, suitable to hand-held image capture, to remove contributions from foreground occluders which can both attenuate the background and/or contribute significant radiance to the image.

This can be accomplished, for example, by automatically detecting the occluded rays at each of a number of microlens locations of a light field camera, and masking that light out, for example, while rendering a sharply focused image of the background. For example, in some embodiments, one or more rays received from a background component of the first image and one or more rays attributed to an occluding component of the first image can be identified and where the appearance of the identified occlusion in the modified image has been reduced based upon the reduction of the appearance of the rays attributed to the occluding component, amplification of the rays attributed to the background component, or a combination of these.

Figure 2:
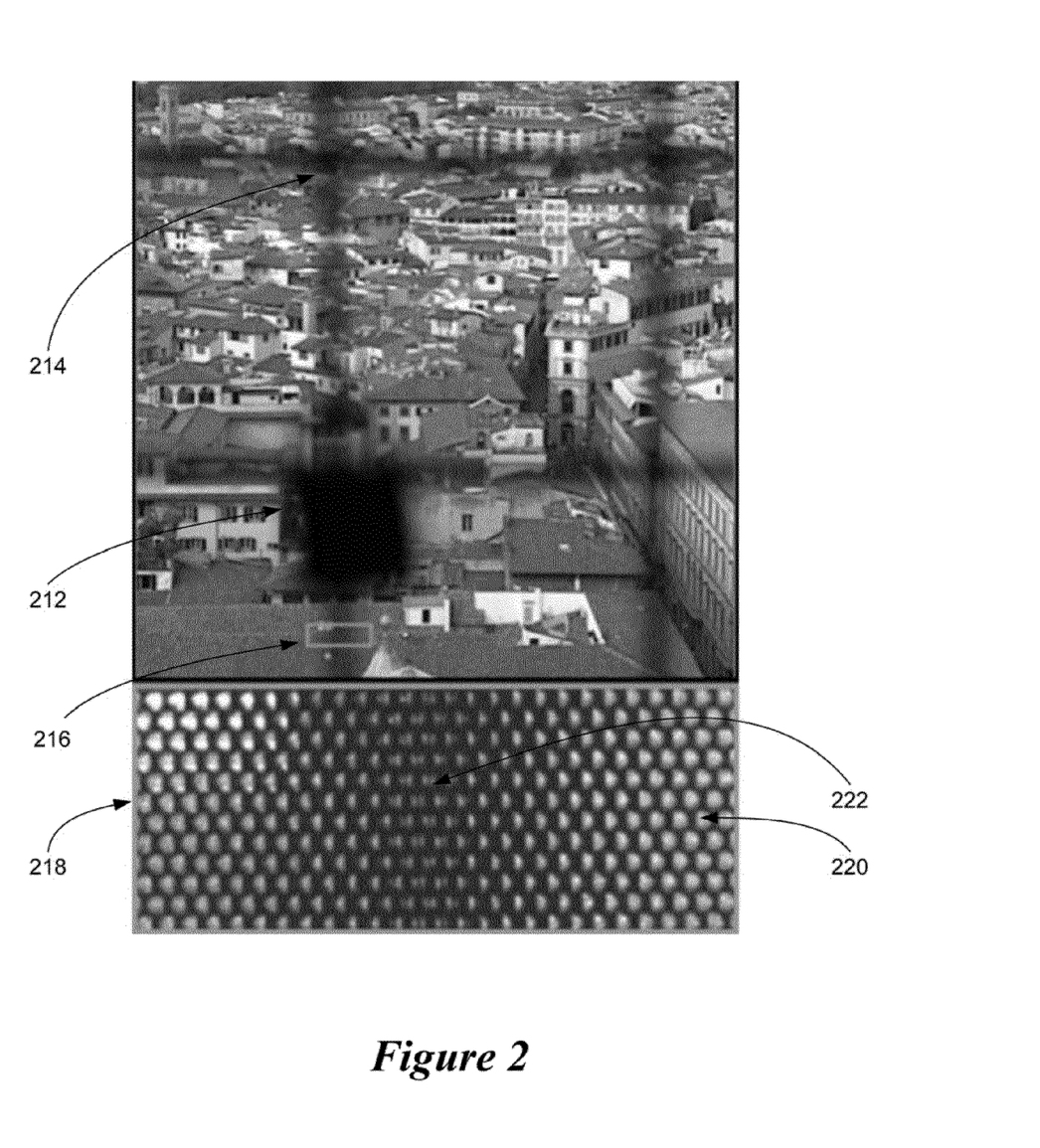
FIG. 2 illustrates a top image having an occlusion due to an attenuating foreground object (a metal grating) with a bottom image illustrating a region of the image outlined by the rectangle in the top image.

The top image of FIG. 2 is a light field rendering with occlusion due to an attenuating foreground object (a metal grating). The bottom image is a region of the light field camera sensor image from the region outlined by the rectangle in the top image.

FIG. 2 provides an image of a cityscape taken through an opening with a metal grating to which someone has attached a padlock. This image demonstrates both, partial occlusion 214 (the darkened linear regions), where the background can still be seen, and complete occlusion 212 (the darkened rectangle of the lock) where it can't.

Because the grating is poorly lit, it attenuates light without contributing radiance to the image. While the image is one rendering (focused on the background), the light field structure contains more information than is contained in this rendering.

The rectangular inset 218 corresponds to the outlined region 216 of the top image, and shows the image recorded on the CCD sensor of the light field camera, which is captured, for example, through a hexagonal lenslet array. The far left and right regions of the inset 220 show that, away from the occluded region, the lenslet appears to produce a circular spot (e.g., from background radiance).

Moving toward the center of the image 222, the vertical occluder begins to block an increasing proportion of the incident lighting directions. Even in the inset's center, though, the occluder does not completely block any of the lenslets, meaning that the light field captures some rays originating from all parts of the background in this region. FIG. 2's inset also provides an intuitive illustration of how the contribution of the foreground occluder could be removed when rendering an image.

With respect to the occluder's role in contributing illumination to the sensor, this illumination should be identified and canceled from the light field. For example, if the parts of the light field which are blocked by the occluder (here, the black pixels within the circular spots) can be identified, evaluated, and potentially masked out so that they do not contribute to any rendered pixel.

With respect to the occluder's role as an attenuator of background light, identifying the parts of the light field which are blocked also can indicate the fraction of incoming rays blocked by the foreground. Then, for those image pixels rendered using less than the full complement of light field samples due to the masking, amplification can be applied to the intensity rendered from the background radiance. For instance, the background appearance information can be modified to increase the intensity of the background appearance information when the modified image is rendered. So, the problem of rendering a background image without the attenuation or contribution of the foreground object can, for example, be reduced to identifying those parts of the light field which represent the foreground occluder.

Figure 3:
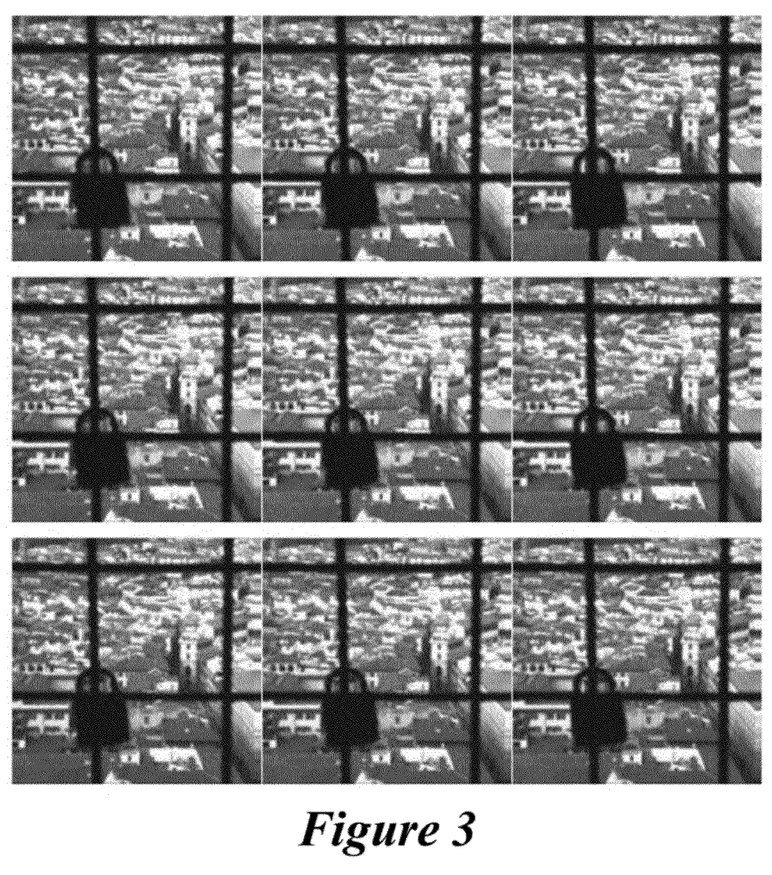
FIG. 3 illustrates 9 sub-aperture images for use in an illustrative example of an embodiment of the present disclosure.

While the raw CCD image shown in FIG. 2 is one illustration of the captured light field, it may be more useful (for purposes of the present disclosure) to represent the light field as a collection of sub-aperture images, as illustrated in FIG. 3 below. In this representation, the pixels from the raw CCD image are re-arranged to create an array of images, with the pixels in each image coming from the same position under every micro-lens. Each sub-aperture image can be thought of as capturing a traditional image of the light passing through only a small sub-aperture region of the camera's lens.

Given the spot size of the light filed camera's microlenses, the raw image can be re-arranged into an array (e.g., 9-by-9) of such images; the central 3-by-3 region is shown in FIG. 3. FIG. 3 provides 9 sub-aperture images of an illustrative example an embodiment of the present disclosure. While they appear quite similar, the foreground region (the black pixels) shift by about 7 pixels between neighboring images. Note: These images look low quality because they are from raw CCD values; they have not been transformed to SRGB space, tone-mapped by the camera response function, or color-corrected. A shift between the central and non-central sub-aperture images can be identified and this information can be used to render the modified image based upon the identified shift.

While these images are quite similar, they each have a unique optical center within the camera's aperture plane and the same real world object will appear in different locations of each sub-aperture image. That is, the sub-aperture images provide parallax on the captured scene: foreground objects (such as the occluding grating) have relatively higher displacements between adjacent sub-aperture images than background objects (the buildings). This difference can be utilized to determine which elements of a sub-aperture image are in the foreground and which are in the background.

Figure 4:
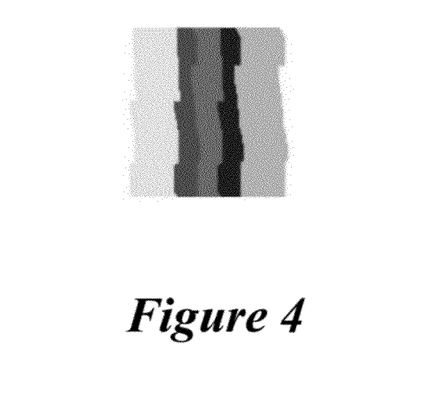
FIG. 4 illustrates an example of a false-color image illustrating foreground parallax within the inset region of FIG. 2.

The displacement of the foreground region shown in FIG. 2's inset is illustrated in FIG. 4. FIG. 4 provides a false-color image illustrating foreground parallax within the inset region of FIG. 2. The red channel of this image indicates the foreground and background regions (intensities of 0 and 255, respectively) of the left-most sub-aperture image. The green and blue channels show the same for the central and right-most sub-aperture images, respectively. The lack of black pixels in this image illustrates that there is no complete occlusion within this region of the image.

In order to estimate the foreground and background regions of the light field, then, parallax can be used between the sub-aperture images. Foreground regions are characterized by relatively higher displacements between sub-aperture images, and background regions by small displacements. That is, a pixel representing the foreground will shift by a larger distance than one representing the background.

As we have shown above, the light field data structure and rendering path can offer both a mechanism to remove the contribution of a foreground occluder from a refocused image given a foreground mask and cues needed to estimate that mask. Described below are details of an example method embodiment of the present disclosure that could be used to estimate the mask, and to render a focused image of the background without the contribution or attenuation of the foreground occluder.

Also discussed are implementation details of how the light field camera is utilized. Throughout, sub-aperture images are referred to as for $L^{(u,v)}u$, $v \in \{-4, -3, \ldots 4\}$. We also refer to $L^{(0,0)}$ as the central sub-aperture age since it represents the rays passing through the center of the aperture.

Figure 5:
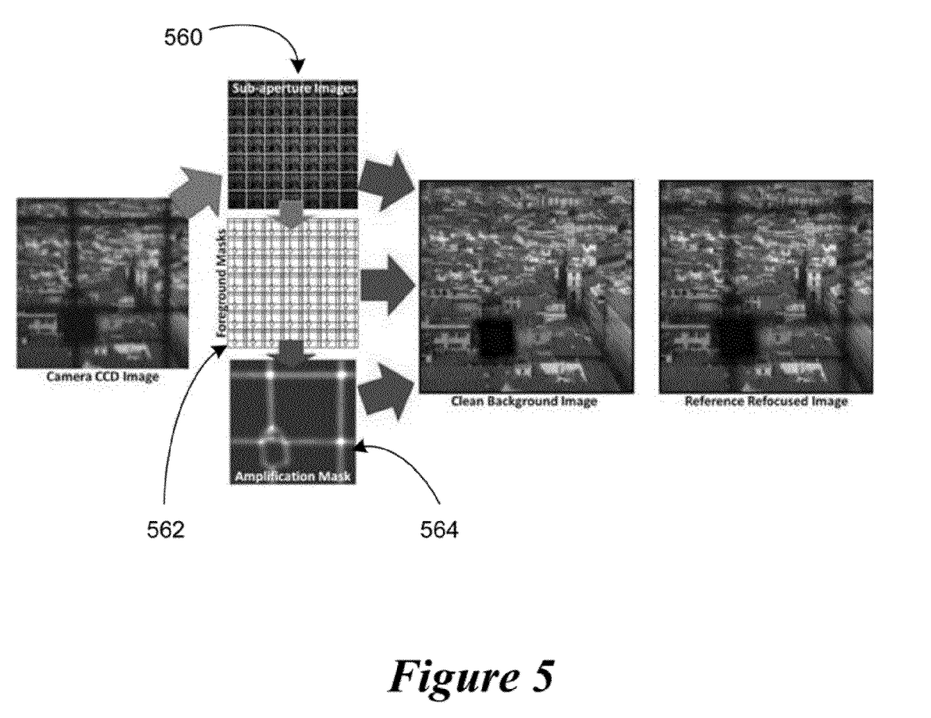
FIG. 5 Illustrates several steps of a method embodiment of the present disclosure.

FIG. 5 shows the steps of one method, illustrated using example input. Starting from the raw CCD image information extracted from the light field image file format, the sub-aperture image representation of the light field 560 (first arrow on the left) can be generated. From this, the foreground and background regions can be estimated using parallax (upper arrow pointing down) and foreground masks 562 can be created.

From the foreground masks, the amount of attenuation at each microlens can be estimated, and then the un-occluded regions of the sub-aperture images can be rendered to generate a generally clean, focused background image (lower downward arrow and arrows on the right). For comparison, a reference light field rendering that has been refocused is shown on the right.

In various embodiments, the lenslet image is converted to the sub-aperture image representation of the light field. The foreground mask can then be estimated for the central sub-aperture image using graph cuts for energy minimization and is then shifted to generate masks for the other sub-aperture images.

The masks are used to determine an amplification map (e.g., amplification map 564) needed to counter the attenuating effect of the foreground. The amplification map, foreground masks, and sub-aperture images can then be combined to render a clean background image. For reference, the embodiment of FIG. 5 also shows a refocusing process applied to the same image without masking out foreground occlusion.

From the sub-aperture images $L^{(u,v)}$, a set of binary masks $M^{(u,v)}$ can be estimated indicating foreground regions in those images using parallax as a cue. It can be assumed that the scene includes two distinct focus layers: the nearby foreground and the more distant background. Note that the assumption that the background is a focus plane does not require that it be an equal-depth plane, as a distant focus plane may include a wide range of depths, such as the cityscape (e.g., ranging from a few hundred meters to several kilometers) shown in FIG. 2.

As mentioned above, the foreground and background focal planes will have different displacements, which can be referred to as $\delta_f^{(u,v)}$ and $\delta_b^{(u,v)}$ respectively, in each sub-aperture image. It can be estimated that the displacements using scale-invariant feature transform (SIFT) features extracted from $L^{(u,v)} \forall u$, the sub-aperture images with $v=0$.

For example, in some embodiments, features are extracted from the sub-aperture images. The features from each non-central sub-aperture image can be matched to those from the central sub-aperture image. For example, these features can be used to identify central and non-central sub-aperture images and match a non-central sub-aperture image with a corresponding central sub-aperture image during analysis of the extracted sub-aperture image information.

Since the displacement between sub-aperture images with $v=0$ has to be horizontal, we remove erroneous matches by discarding those with a significant vertical shift, greater than a threshold (e.g., at least 5 pixels). The remaining shifts can be normalized (e.g., divided by u) and combined to a single distribution.

In cases where both the foreground and background have enough texture to match features, the distribution of remaining shifts will be bi-modal, for example: one mode for shifts from foreground features, and another mode for shifts from background features. However, because of under-illumination and defocus of the foreground (which may still be observed in the sub-aperture images), foreground regions often lack the features necessary to be matched. In such cases, including the present example, the distribution of shifts can have only one mode.

In some embodiments, feature points can be used to indicate the amount of shift that is occurring. For example in Figure three, a feature point can be designated at an edge of a foreground feature on the sub-aperture images and this feature point can be compared between the sub-aperture images (thereby tracking a number of feature points within the first image information) to identify the amount of shift and/or its directional vector. This tracking can be accomplished, for example, by selecting the number of feature points by matching them using scale-invariant feature transform (SIFT) or speeded-up robust features (SURF), among other methods.

In order to distinguish between these cases, a two component Gaussian mixture model can be fit to the shift distribution, giving us means and standard deviations ($\mu_1$, $\sigma_1$) and ($\mu_2$, $\sigma_2$). If the two distributions are too similar, such as less than a threshold (e.g., $\|\mu_1 - \mu_2\| < 5$ pixels), or if the smaller distribution accounts for fewer than a threshold amount of matches (e.g., less than 10% of the matches), this case can be considered where the foreground lacks sufficient texture and a one-component Gaussian fit to the (background) shifts with ($\mu_b$, $\sigma_b$) can be computed. If the distributions have different means and the smaller represents less than a threshold amount of the shifts (e.g., at least 10% of the shifts), it can be considered a case with both foreground and background texture. In both cases, the background shifts $\delta_b^{(u,v)}$ are estimated from the model fits; for textureless foregrounds $\|\delta_b^{(0,1)}\| = \|\delta_b^{(1,0)}\| = \mu_b$, and for textured foregrounds $\|\delta_b^{(0,1)}\| = \|\delta_b^{(1,0)}\| = \min(\mu_1, \mu_2)\|$.

In some embodiments, the median of the samples from each component can be more robust to outliers, and use it in the implementation. The remaining background shifts $\delta_b^{(u,v)} = u\delta_b^{(1,0)} + v\delta_b^{(0,1)}$. In both textured and textureless foreground cases, foreground/background label of each pixel in the central stab-aperture image using graph cuts can be estimated, where the cost of assigning a pixel to the background is $$C_b^{(0,0)}(x) = \max_{u,v} \|L^{(0,0)}(x) - V(u,v)L^{(u,v)}(x + \delta_b^{(u,v)})\|. \quad (1)$$

In other words, this cost can be the maximum difference between the central sub-aperture image's pixel intensity and the intensities of the pixels that would correspond to it if it were a background pixel.

While the background label cost is the same in both the textured and textureless foreground cases, the determination of the foreground label cost for each pixel is different in the two cases.

Textured Foreground Case

In the textured foreground case, we estimate $$\|\delta_f^{(0,1)}\| = \|\delta_f^{(1,0)}\| = \|\max(\mu_1, \mu_2)\|.$$

and compute the foreground label cost in the same way as the background. That is, $$C_f^{(0,0)}(x) = \max_{u,v} \|L^{(0,0)}(x) - V(u,v)L^{(u,v)}(x + \delta_f^{(u,v)})\|. \quad (2)$$

Here, $V(u, v) \geq 1$ is a multiplicative term to account for vignetting of the microlenses. Because the central sub-aperture image is made up of pixels on each microlens's optical axis, it is brighter than other sub-aperture images. The brightness of the other sub-aperture images decreases with $\|u,v\|$, so V is proportional it. We can determine V empirically, for example, by calibration.

Textureless Foreground Case

In the case of textureless foregrounds, the cost of a foreground labeling for a pixel can be defined without knowing the shifting of the foreground focal layer. Since this case generally corresponds to a strictly attenuating occluder, the foreground can appear as a region of constant intensity. So, the cost of a foreground label at a pixel can be computed as the intensity difference between its intensity and the average intensity of those pixels with the highest background cost, $$C_f^{(0,0)}(x) = \|L^{(0,0)}(x) - I_f\|, \text{ where} \quad (3)$$

$$I_f = \frac{\sum_x \Omega(x) L^{(0,0)}(x)}{\sum_x \Omega(x)}, \quad (4)$$

and $\Omega$ is an indicator which is one for pixels above a threshold (e.g., the $98^{th}$ percentile of $C_b$) and zero elsewhere.

Mask Propagation

Once the foreground mask $M^{(0,0)}$ is estimated by graph cuts for the central sub-aperture image, it can be propagated to the other sub-aperture images. In cases where the foreground region contained enough matched SIFT features to estimate the foreground shifts, $\delta_f^{(u,v)}$ may already be known. Otherwise, a search can be done for the shift between $L^{(0,0)}$ and $L^{(0,1)}$ that minimizes the RMS difference in the masked pixels, e.g., $$\delta_f^{(0,1)} = \operatorname{argmin}_{\hat{\delta}} \sum_x \left(L^{(0,0)}(x)M^{(0,0)}(x) - L^{(0,1)}(x+\hat{\delta})M^{(0,1)}(x+\hat{\delta})\right)^2. \quad (5)$$

This value can then be extrapolated to find the remaining $\delta_f^{(u,v)}$. Once the full set of shifts are known, the shifted masks are computed as $$M^{(u,v)}(x) = M^{(0,0)}(x + \delta_f^{(u,v)}). \quad (6)$$

Rendering a Clean Background

In order to render a focused background while removing the contribution of the foreground occluder, a shift-and-add re-focusing method can be utilized. For example, a shift and add method that renders the light field to an image focused on particular object by shifting the sub-aperture images such that they are all aligned with respect to the object can be used. That is, given the object's displacement $\delta_o^{(u,v)}$ for each sub-aperture image, the focused image at pixel x is $$I(x) = \sum_{u,v} L^{(u,v)}(x + \delta_b^{(u,v)}). \quad (7)$$

Given a set of binary masks $M^{(u,v)}$ indicating foreground regions, and the background's displacement $\delta_b^{(u,v)}$, an unoccluded background image can be rendered $$\hat{I}(x) = A(x) \sum_{u,v} (1 - M^{(u,v)}(x + \delta_b^{(u,v)})) L^{(u,v)}(x + \delta_b^{(u,v)}). \quad (8)$$

Terms of the summation where x might get a contribution from the foreground in eq. 7 can be those where $M^{(u,v)}=1$, causing cancellation in eq. 8. The amplification term A accounts for the loss of signal due to the occlusion within sub-aperture images. In order to account for the vignetting of the microlenses causing the intensity of sub-aperture images decreases with $\|(u,v)\|$.

$$A(x) = \frac{\sum_{u,v}(1 - M^{(u,v)}(x + \delta_b^{(u,v)}))1/V(u,v)}{\sum_{u,v} 1/V(u,v)}, \quad (9)$$

where $L_W$ captures the relative intensities of the sub-aperture images. Multiple images of a uniformly-lit white wall can be captured, as a calibration image, to characterize $L_W$.

In some embodiments, in order to extract the raw CCD image information from the light field camera files, an lfpsplitter tool, and de-mosaic the Bayer BGGR array using Matlab's demosaic function can be used.

Rather than a rectangular one, finding the spot centers behind the microlenses can be non-trivial in some implementations. For example, the spot centers can be recovered by capturing several images of a uniformly-lit white substrate, that can be used as a calibration image. After averaging the de-mosaiced sensor images (to reduce noise), the brightest pixel behind each microlens could be empirically found. The location of the brightest pixels was then saved in order to indicate the locations of the (hexagonal) sub-aperture image $L^{(0,0)}$.

Other sub-aperture images can be found by displacements from these locations, and each sub-aperture image can be interpolated to a rectangular pixel grid, for example, by using MATLAB's TriScatteredInterp functions. After refocusing, the camera response function and CCD RGB to SRGB color correction specified in the image metadata can be applied. Any quality gap between a refocused result and a light field camera's image could be improved with interpolation, a demosaicing method tailored for light field cameras, and a careful determination of the microlens spot centers, in some embodiments.

Figure 6:
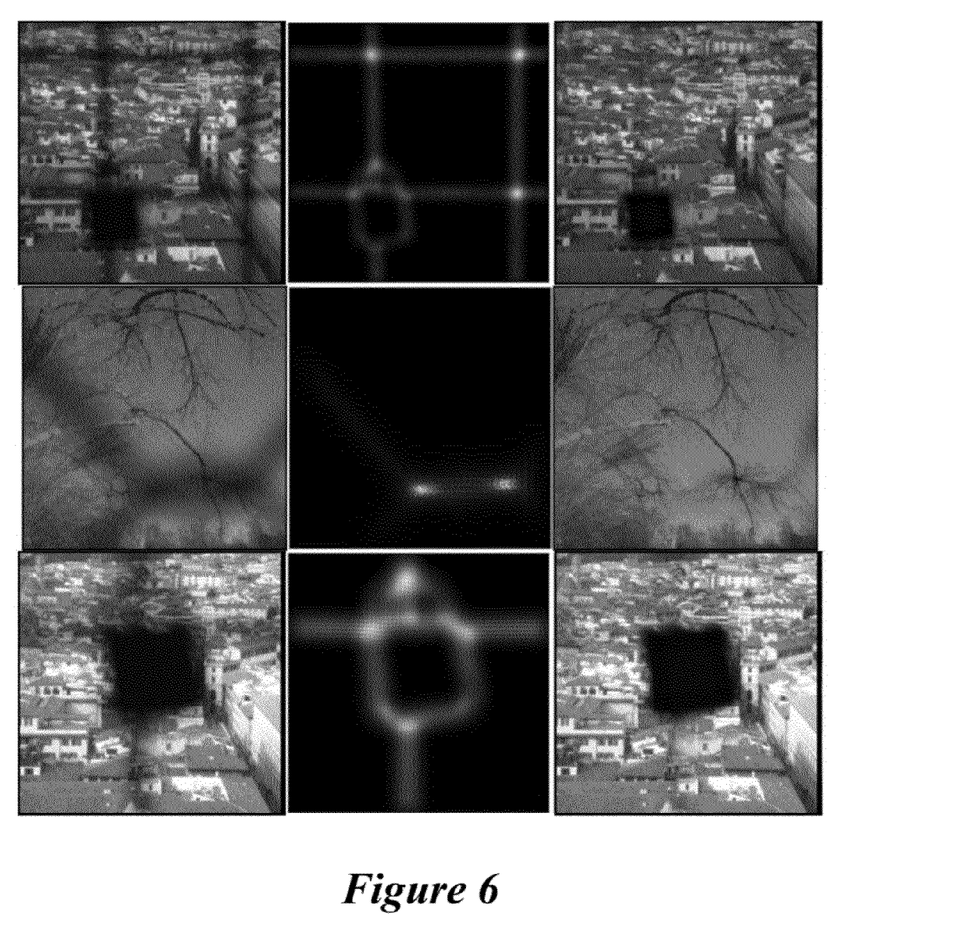
FIG. 6 illustrates three examples wherein embodiments of the present disclosure have been utilized.

FIG. 6 above shows the results of a method embodiment of the present disclosure applied to several images with attenuating occluders (e.g., fences and metal gratings). The left column shows, for reference, a rendering of the light field for sharp focus on the background, with partial occlusion. The center column shows the degree of amplification utilized to cancel the attenuation due to the occluder. The right column shows the output of a method embodiment of the present disclosure, with partial occlusion removed and a clearer rendition of the background. In the middle row, diagonal banding artifacts can be observed in the sky region of both the reference rendering and cleaned output images, likely due to inaccuracies of the estimate of the microlens array structure. Otherwise, the reconstructed image quality is much improved by the method of the present disclosure.

Due to amplification of signal from a decreasing number of sensor pixels, rendered pixels in the regions of high partial occlusion exhibit increased noise. While this is typical for methods that remove partial occlusion, the effect, in this example is less here than for methods that work with traditional images, since the light field rendering step can add the intensity from several sensor pixels, reducing certain noise sources.

In some embodiments, in order to render images free of partial occlusion and to be used on single images from a hand-held camera, less information than previous methods can be used, but certain assumptions may be made to do so. For example, it can be assumed that the scene has two focal planes, though we note that the background focal plane can have significant depth variation within it (e.g., the landscapes and tree/sky regions in our examples). Some method embodiments can also be limited to cases where the shift of the background layer between sub-aperture images is non-zero.

It is presumed that in some instances, there will be cases where the background depth results in no shift across sub-aperture images, in which case the cost functionals used for segmentation will all be zero. While differences in pixel intensity may help separate the foreground and background layers in such cases, this ability may be limited.

In various embodiments, the camera or other device having computing functionality can perform some or all of the functions discussed herein. For example, a computing device (i.e., a device having computing functionality, as described herein, can also include a computer readable medium (CRM) (e.g., memory) in communication with processing resources. For example, in the embodiment of FIG. 7, an example system that can be utilized with embodiments of the present disclosure is illustrated. Although shown as a computing device in communication with an imaging device (e.g., camera) in some embodiments, the functionality described herein could be accomplished using a processor and memory within the imaging device. In some embodiments, the imaging device, user interface, processor, and memory can be located on separate devices that are in communication with each other in a wired or wireless manner.

Figure 7:
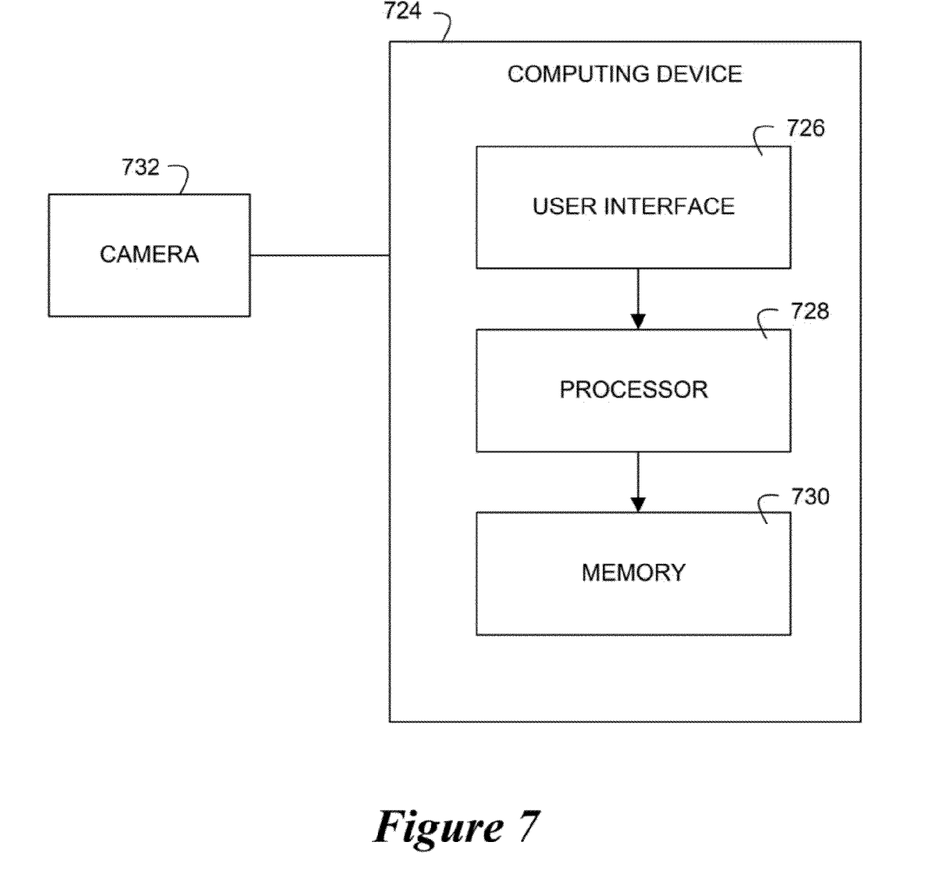
FIG. 7 illustrates an example system that can be utilized with embodiments of the present disclosure.

In the embodiment of FIG. 7, the system includes a computing device 724 having a user interface 726 (e.g., to view the first and/or modified image), a processor 728, and memory 730 and the computing device is in communication with an imaging device 732. In the embodiment of FIG. 7, the CRM is the memory 730 and can be used to hold imaging data (e.g., imaging information from the first image and/or information regarding the modified image) and/or executable instructions to provide the various functionalities described herein.

In various embodiments, the device can include a tangible non-transitory CRM storing a set of computer-readable instructions (CRI) executable by one or more of the processor resources, as described herein. The CRI can also be stored in remote memory managed by a server and represent an installation package that can be downloaded, installed, and executed. The device can include memory resources, and the processor resources can be coupled to the memory resources.

Processor resources can execute CRI that can be stored on an internal or external non-transitory CRM. The processor resources can execute CRI to perform various functions. For example, the processor resources can execute CRI to perform a number of functions.

A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM can also include distributed storage media. For example, the CRM can be distributed among various locations.

The non-transitory CRM can be integral, or communicatively coupled, to a computing device, in a wired and/or a wireless manner. For example, the non-transitory CRM can be an internal memory, a portable memory, a portable disk, or a memory associated with another computing resource (e.g., enabling CRIs to be transferred and/or executed across a network such as the Internet).

The CRM can be in communication with the processor resources via a communication path. The communication path can be local or remote to a machine (e.g., a computer) associated with the processor resources. Examples of a local communication path can include an electronic bus internal to a machine (e.g., a computer) where the CRM is one of volatile, non-volatile, fixed, and/or removable storage medium in communication with the processor resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path can be such that the CRM is remote from the processor s resources such as in a network relationship between the CRM and the processor resources.

That is, the communication path can be a network relationship. Examples of such a network relationship can include a local area network (LAN), wide area network (WAN), personal area network (PAN), and the Internet, among others. In such examples, the CRM can be associated with a first computing device and the processor resources can be associated with a second computing device.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

As described herein, the present disclosure includes embodiments that present a method to automatically remove partial occlusion from a single photograph captured using a light field camera. By removing the requirement that the photographer capture several images using different settings without moving the camera, such embodiments of the present disclosure enable everyday photographers to improve the quality of images taken through fences or other intermediate layers.

Such methods, for example, can be based on a modification of light field rendering which effectively defines a custom aperture mask for a number of microlenses, with the mask designed to block light from the foreground occluder. The aperture mask can be estimated by exploiting parallax which causes different shifts of objects in the foreground and background focal planes.

Methods can also be utilized to remove the contribution of opaque occluding objects and translucent occluders such as smudges or dust on the lens. For example, these occluders can be addressed by realizing that the translucent occluder lies on the focal plane corresponding to the lens surface which is a known plane.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. Rather, inventive subject matter lies in less than all features of a single disclosed embodiment.

What is claimed is:

1. A method for reducing an occlusion in an image, comprising:
   providing image information from a first image taken from a light field camera;
   analyzing image information from multiple sub-aperture images extracted from the image information of the first image to separate foreground and background appearance information by using parallax between the sub-aperture images to determine which elements of a sub-aperture image are in the foreground and which are in the background;
   creating a mask of an occlusion based on the separated foreground and background appearance information; and
   rendering a second, modified image where the mask has been applied to reduce the occlusion in the modified image.

2. The method of claim 1, wherein analyzing image information from multiple sub-aperture images extracted from the image information of the first image includes tracking a number of feature points within the first image information.

3. The method of claim 2, wherein tracking a number of feature points within the first image information includes selecting the number of feature points by matching them using scale-invariant feature transform object recognition.

4. The method of claim 2, wherein tracking a number of feature points within the first image information includes selecting the number of feature points by matching them using speeded-up robust features object recognition.

5. The method of claim 1, wherein the method further includes analyzing a calibration image prior to analyzing the multiple sub-aperture images.

6. The method of claim 1, wherein creating a mask of an occlusion includes creating a binary mask based on the separated foreground and background appearance information for use in rendering the second image.

7. The method of claim 1, wherein creating a mask of an occlusion includes creating a continuously valued mask based on the separated foreground and background appearance information for use in rendering the second image.

8. The method of claim 1, wherein providing image information from a first image taken is provided from a microlens-based light field camera.

9. A computing device for reducing an occlusion in an image, comprising:
   a memory; and
   a processor coupled to the memory, wherein the processor is configured to execute executable instructions stored in the memory to:
   provide image information from a first image;
   analyze image information from multiple sub-aperture images extracted from the image information of the first image to separate foreground and background appearance information by using parallax between the sub-aperture images to determine which elements of a sub-aperture image are in the foreground and which are in the background;
   identify an occlusion based on the separated foreground and background appearance information; and
   render a second, modified image where the appearance of the identified occlusion in the modified image has been reduced.

10. The computing device of claim 9, wherein the executable instructions render a second, modified image where the appearance of the identified occlusion in the modified image has been removed.

11. The computing device of claim 9, wherein the executable instructions analyze image information that includes angular information from the first image to separate foreground and background appearance information.

12. The computing device of claim 9, wherein executable instructions include instructions to modify the background appearance information to increase the intensity of the background appearance information when the second image is rendered.

* * * * *